United States Patent [19]

Murayama

[11] Patent Number: 5,668,742
[45] Date of Patent: Sep. 16, 1997

[54] APPARATUS FOR DETERMINING POSITION OF MOVING BODY

[75] Inventor: Osamu Murayama, Isehara, Japan

[73] Assignee: Komatsu Ltd., Japan

[21] Appl. No.: 666,329

[22] PCT Filed: Dec. 6, 1994

[86] PCT No.: PCT/JP94/02044

§ 371 Date: May 28, 1996

§ 102(e) Date: May 28, 1996

[87] PCT Pub. No.: WO95/16184

PCT Pub. Date: Jun. 15, 1995

[30] Foreign Application Priority Data

Dec. 7, 1993 [JP] Japan .................................. 5-306702
Dec. 14, 1993 [JP] Japan .................................. 5-313609

[51] Int. Cl.[6] .................................................. G01B 11/14
[52] U.S. Cl. .......................... 364/559; 318/560; 356/375; 701/217
[58] Field of Search ........................ 364/559, 449, 364/443, 424.01, 424.02, 453, 454, 550, 571.01, 571.02; 318/560, 580, 587; 356/356, 375; 180/167, 169

[56] References Cited

U.S. PATENT DOCUMENTS

| | | | |
|---|---|---|---|
| 4,982,504 | 1/1991 | Söderberg et al. | 33/502 |
| 5,014,204 | 5/1991 | Kamimura et al. | 364/449 |
| 5,025,377 | 6/1991 | Kamimura et al. | 364/449 |
| 5,068,795 | 11/1991 | Kamimura et al. | 364/449 |
| 5,131,754 | 7/1992 | Hawegawa | 356/375 |
| 5,323,152 | 6/1994 | Morita | 340/998 |
| 5,563,787 | 10/1996 | Murayama | 364/424.02 |

FOREIGN PATENT DOCUMENTS

| | | |
|---|---|---|
| 2912603 | 10/1980 | Germany . |
| 4104077 | 6/1992 | Japan . |
| 4372003 | 12/1992 | Japan . |

*Primary Examiner*—Emanuel T. Voeltz
*Assistant Examiner*—Bryan Bui
*Attorney, Agent, or Firm*—Greer, Burns & Crain, Ltd.

[57] ABSTRACT

The first object is to correct deviation of a guided moving body by dead reckoning before and after a lap in order to precisely guide it. A second object is to facilitate determination of initial position and initial bearing of a guided moving body by dead reckoning.

When the moving body 1 travels on a lane L3, the positions of two reference points R11 and R12 located immediately forward of the start point on the lane L3 are calculated as positions on coordinate axes x-y. When the moving body 1 has completed a lap around lane L3, returned to the starting point Ps, and continues to travel, the positions of the two reference points R11 and R12 are recalculated as R'11 and R'12 on the coordinate axes x-y. Deviations of the position and traveling direction of the moving body 1 when it has completed a lap around the lane L3 are corrected on the basis of the positions of the two reference points so calculated and the estimated position and estimated direction Pe (xe, ye, θe) when the moving body has completed a lap around lane L3 and returned to the starting point Ps.

4 Claims, 2 Drawing Sheets

APPARATUS FOR DETERMINING POSITION OF MOVING BODY

DESCRIPTION

1. Technical Field

The present invention relates to an apparatus for determining the position of a moving body subjected to guided travel which employs the so-called dead reckoning method.

2. Background Art

Conventional methods for guiding the travel of a moving body along a predetermined lane include the method commonly termed the dead reckoning method, which involves estimating the position and traveling direction of the moving body on the basis of outputs from a movement distance sensor and a bearing sensor and, on the basis of the results of these estimates, exercising steering control of the travel of the moving body so that it will pass through estimated passage points along an estimated lane that has been taught previously.

In such cases, the absolute position measurement technique (a) or the relative position measurement technique (b) described below is used as the method for measurement of the aforementioned passage point data (course data).

(a) In the absolute position measurement technique surveying or other means is used to calculate each position on the predetermined lane on which the moving body is to travel in terms of an absolute value (such as one based on latitude and longitude), and this is provided as course data during guided travel control.

(b) In the relative position measurement technique, position measurement means identical to that during playback is used during the teaching process as the moving body is moved along the predetermined lane to afford course data.

The aforementioned relative position measurement technique (b) is disclosed in a previously published application (Japanese Patent Application 3-148921) made by this applicant.

Comparison of the aforementioned methods (a) and (b) shows that the relative position measurement technique (b) offers the following advantages.

1) It is easy to input course data.
2) Since the same position measurement equipment is used during course data measurement (teaching) and guidance (playback), common error factors (bias) cancel out, affording precisely guided travel.
3) It is just as easy to produce course data for a snaking, hairpin-turn, or other difficult course as it is for an ordinary course.
4) Since measurements are taken while the moving body is actually moving, travel course data adapted to the maneuverability of the travel body can be obtained.
5) Even if two-dimensional position measurement means is used, the high degree of reproducibility between course data measurement (teaching) and guidance (playback) affords highly precise guidance even when three dimensions are actually involved.

In spite of the numerous advantages of the relative position measurement technique, in cases where repeated laps are made around a closed-loop perimeter course, discrepancies in position and direction at the start point prior to a lap and the same start point after the lap occur, and these require correction.

By way of such a correction method, Japanese Patent Application 3-148921 discloses a technique which involves measuring the positions of two (a first and a second) reference points (reflecting mirrors) at two points in time (prior to a lap and after the lap), and, on the basis of the discrepancies in the positions of the two reference points measured at the two points in time, performing correction of estimated position and estimated bearing upon return to the start point.

The advantage of this technique is that coordinate axes can be established by coordinate transformation calculation means on the basis of the first and second reference points on the course in order to describe the successive estimated position and estimated bearing of the moving body.

Thus, when the moving body repeatedly travels on a predetermined lane which includes the aforementioned first and second reference points, the fact that the positions of the aforementioned first and second reference points have been previously stored as positions on the newly established coordinate axes by the aforementioned coordinate transformation calculation means allows the aforementioned first and second reference points to be measured at two points in time by traveling one lap from the start point back to the start point, and the aforementioned discrepancies to be corrected.

Depending on the layout of the course, there may be cases in which a moving body travels over another lane which does not contain the aforementioned first and second reference points.

In such cases as well, it is necessary to describe the estimated position and estimated bearing on the same coordinate axes on the basis of the aforementioned first and second reference points. However, since the first and second reference points are not present on the lane, the same reference points cannot be measured at two points in time simply by a teaching process involving travel in a single lap from the start point back to the start point, so the aforementioned discrepancies cannot be corrected.

There existed no solution to this problem in the prior art, making the use of the absolute position measurement method unavoidable.

The first invention of the present invention was developed with the foregoing in view, and is intended to provide an apparatus for performing correction of discrepancies in position and traveling direction before and after a lap of a lane, and hence to afford guided travel of the moving body with good precision by means of a relative position measurement technique, even when the moving body travels over a plurality of different lanes that have no two common reference points.

In the dead reckoning guidance method, where dl(t) is the output of the movement distance sensor at time t and θ (t) is the output of the bearing sensor at time t, and with (X0, Y0) as the initial position at time t0, the two-dimensional position of the moving body at time t (x(t), y(t)) is given by equations (8) and (9), below.

$$x(t) = \int_{t0}^{t} \cos\theta(t) dl(t) + X0 \tag{8}$$

$$y(t) = \int_{t0}^{t} \sin\theta(t) dl(t) + Y0 \tag{9}$$

Here, assuming that, for example, an angular velocity sensor is used as the bearing sensor, the sensor output is angular velocity ω (t), and the bearing θ (t) is expressed as a value obtained by integrating the angular velocity ω (t), with the initial bearing as Θ0.

$$\theta(t) = \int_{t0}^{t} \omega(t)dt + \Theta 0 \quad (10)$$

As equations (8) through (10), above, clearly demonstrate, a determination of the position and bearing of a moving body by calculation requires the initial values X0, Y0, and Θ0. These initial values necessitate establishing a predetermined coordinate system, i.e., coordinate axes, and describing the initial values.

Conventional methods for establishing this kind of coordinate system include the methods listed in (c) through (e), below.

(c) Method for measuring initial position by triangulation

First, arbitrary coordinate axes are chosen in the field through which the moving body will move. On the basis of points which serve as a reference in the coordinate system, the principle of triangulation is used to measure the initial values of the moving body using an optical measurement apparatus or the like.

However, this technique requires a rather elaborate system for dedicated initial position measurement, and is not only costly but also requires considerable labor and a complex procedure.

In addition, this technique does not allow the initial bearing value Θ0 indicated by equation (10), above, to be readily determined with any accuracy. If the accuracy of measurement of the initial bearing value Θ0 is not satisfactory, the accuracy of measurement of position is affected, as indicated by equations (8) and (9), and position measurement accuracy will be adversely affected. (d) Another method is to move the moving body to a position surveyed in advance using the aforementioned triangulation method of (c).

However, in some cases it is difficult to precisely stop the moving body at the designated location. It is also difficult to stop it accurately in the designated direction. Thus, the method can result in poor accuracy.

(e) Another method is to use the global positioning system (GPS).

However, this requires the use of the expensive GPS in order to perform measurement with good accuracy. Further, the coordinate system is limited to the GPS coordinate system, which imposes the inconvenience of limitations in apparatus design. Further, even though it is possible to calculate initial location, the initial bearing Θ0 cannot be determined.

The second invention of the present invention was developed with the foregoing in view, and is intended to provide an apparatus that can be used to establish coordinate axes for a moving body easily and inexpensively, and that can accurately describe not only initial position but also initial bearing.

SUMMARY OF THE INVENTION

The first invention of the present invention is an apparatus for determining the position of a moving body, comprising: estimate calculation means for estimating the position and traveling direction of a moving body on predetermined coordinate axes; and relative position detection means for detecting the relative position of the moving body with respect to reference points established intermittently along a predetermined lane for the moving body, the position and traveling direction of the moving body that have been estimated by the estimate calculation means being corrected intermittently on the basis of the output of the relative position detection means and the positions of the reference points so that the moving body travels along the predetermined lane on the basis of the corrected position and traveling direction; wherein the predetermined lane comprises a closed-loop first lane which has first and second reference points immediately forward of the start point, and a closed-loop second lane which has no first or second reference point, the apparatus comprises: reference point position calculation means for calculating the position of the first reference point on the basis of the estimated position output by the estimate calculation means when the moving body passes the first reference point on the first lane and of the relative position of the moving body with respect to the first reference point output by the relative position detection means, and for calculating the position of the second reference point on the basis of the estimated position output by the estimate calculation means when the moving body passes the second reference point on the predetermined lane and of the relative position of the moving body with respect to the second reference point output by the relative position detection means; coordinate transformation calculation means for establishing new coordinate axes, which differ from the predetermined coordinate axes, on the basis of the positions of the first and second reference points on the predetermined coordinate axes calculated by the reference point position calculation means, performing calculations to transform the position and traveling direction on the predetermined coordinate axes output by the estimate calculation means into a position and traveling direction on the newly established coordinate axes, and using the transformed position and traveling direction as initial value settings for estimate calculation by the estimate calculation means; first deviation calculation means for storing the positions of the first and second reference points as positions on the newly established coordinate axes in the coordinate transformation calculation means, calculating the positions of the first and second reference points with the reference point position calculation means just before the moving body returns to the start point after completing a lap of the first lane, and calculating the reference point deviation produced when the moving body has completed a lap of the first lane on the basis of the positions of the first and second reference points stored in the coordinate transformation calculation means and the positions of the first and second reference points which have been recalculated before the moving body returns to the start point after completing a lap of the first lane; first correction means for correcting the position and traveling direction of the moving body each time that the moving body completes a lap of the first lane and returns to the start point on the basis of the deviation calculated by the first deviation calculation means; second deviation calculation means for calculating with the reference point calculation means the positions of two reference points immediately after the start point on the second lane as positions on the coordinate axes that have been established in the coordinate transformation calculation means for the first lane as the moving body travels on the second lane, recalculating the positions of the two reference points with the reference point calculation means when the moving body has completed a lap of the second lane, returned to the start point, and subsequently continued to travel, and calculating the reference point deviation produced when the moving body has completed a lap of the second lane on the basis of the positions of the two reference points calculated just after starting a lap of the second lane and the positions of the two reference points recalculated after the moving body has returned to the start point after completing a lap of the second lane; and second correction means for correcting the position and traveling direction of the moving body each time that the moving body completes a lap of the second lane and returns to the start point on the basis of the deviation calculated by the second deviation calculation means.

In accordance with the design of the first invention, the predetermined lane comprises a closed-loop first lane which has a first and second reference point used by coordinate transformation calculation means for establishing coordinate axes in the vicinity of the start point, and a closed-loop second lane which has no first or second reference point.

The following takes place when the moving body travels on the first lane. First, the position of the first reference point is calculated by the reference point position calculation means on the basis of the estimated position output by the estimate calculation means when the moving body passes the first reference point on the first lane and the relative position of the moving body with respect to the first reference point output by the relative position detection means. In addition, the position of the second reference point is calculated by the reference point position calculation means on the basis of the estimated position output by the estimate calculation means when the moving body passes the second reference point on the predetermined lane and the relative position of the moving body with respect to the second reference point output by the relative position detection means.

Next, new coordinate axes, which differ from the predetermined coordinate axes, are established on the basis of the positions of the first and second reference points on the predetermined coordinate axes calculated by the reference point position calculation means, calculations are performed to transform the position and traveling direction on the predetermined coordinate axes output by the estimate calculation means into a position and traveling direction on the newly established coordinate axes, and these are used as initial values for estimate calculation.

Next, the positions of the first and second reference points are stored in the coordinate transformation calculation means as positions on the newly established coordinate axes. The positions of the first and second reference points are then recalculated by the reference point position calculation means just before the moving body returns to the start point after completing a lap of the first lane. Finally, the reference point deviation produced when the moving body has completed a lap of the first lane is computed by the first deviation calculation means on the basis of the calculated positions of the first and second reference points and the positions of the first and second reference points which have been recalculated when the moving body returns to the start point after completing a lap of the first lane.

The position and traveling direction of the moving body are corrected on the basis of this calculated deviation each time that the moving body completes a lap of the first lane and returns to the start point.

The following takes place when the moving body travels on the second lane.

First, when the moving body travels on the second lane, the positions of two other reference points immediately after the start point on the second lane are calculated as positions on the coordinate axes by the reference point position calculation means, using the same coordinate axes as on the first lane. The positions of the two reference points are then recalculated as positions when the moving body has completed a lap of the second lane, returned to the start point, and subsequently continued to travel. Finally, the reference point deviation produced when the moving body has completed a lap of the second lane is calculated on the basis of the positions of the two reference points calculated just after starting out on the second lane and the positions of the two reference points recalculated after the moving body has returned to the start point after completing a lap of the second lane.

On the basis of this calculated deviation, the position and traveling direction of the moving body are corrected each time that the moving body completes a lap of the second lane and returns to the start point.

The second invention of the present invention is an apparatus for determining the position of a moving body, comprising estimate calculation means for estimating the position and traveling direction of a moving body on predetermined coordinate axes, and relative position detection means for detecting the relative position of the moving body with respect to reference points established intermittently on a predetermined lane for the moving body, wherein the apparatus comprises reference point position calculation means for calculating the position of a first reference point on the basis of the estimated position output by the estimate calculation means when the moving body passes the first reference point on the predetermined lane and the relative position of the moving body with respect to the first reference point output by the relative position detection means, and for calculating the position of a second reference point on the basis of the estimated position output by the estimate calculation means when the moving body passes the second reference point on the predetermined lane and the relative position of the moving body with respect to the second reference point output by the relative position detection means, and coordinate transformation calculation means for establishing new coordinate axes, which differ from the predetermined coordinate axes, on the basis of the positions of the first and second reference points on the predetermined coordinate axes calculated by the reference point position calculation means, performing calculations to transform the position and traveling direction on the predetermined coordinate axes output by the estimate calculation means into a position and traveling direction on the newly established coordinate axes, the position and traveling direction transformed by the coordinate transformation calculation means being used as initial values for estimate calculation by the estimate calculation means.

According to the design of the second invention, the position of the first reference point is calculated on the basis of the estimated position output by the estimate calculation means when the moving body passes the first reference point on a predetermined lane and the relative position of the moving body with respect to the first reference point output by the relative position detection means. The position of the second reference point is calculated on the basis of the estimated position output by the estimate calculation means when the moving body passes the second reference point on a predetermined lane and the relative position of the moving body with respect to the second reference point output by the relative position detection means.

Fundamentally, the position of a moving body can be determined accurately on the basis of relative position afforded by relative position detection means and a the position of a known reference point, and the estimated position corrected thereby; here, calculation of reference point position may be likened to inverse calculation of this fundamental calculation.

Also, new coordinate axes which differ from the predetermined coordinate axes are established on the basis of the positions of the first and second reference points on the predetermined coordinate axes which have been calculated by the reference point position calculation means. For example, with the second reference point as the origin, the line segment connecting the first reference point and the second reference point may be designated as the x axis. The position and traveling direction on the predetermined coordinate axes output by the estimate calculation means are then transformed into a position and traveling direction on these newly established coordinate axes, and the initial position and initial direction are defined accurately by the newly establish coordinate axes.

This procedure readily affords initial values inexpensively and without considerable labor.

BEST MODE FOR CARRYING OUT THE INVENTION

Embodiments of the apparatus for determining the position of a moving body which pertains to the present invention will be described below with reference to the drawings.

First Embodiment

Figure 1:
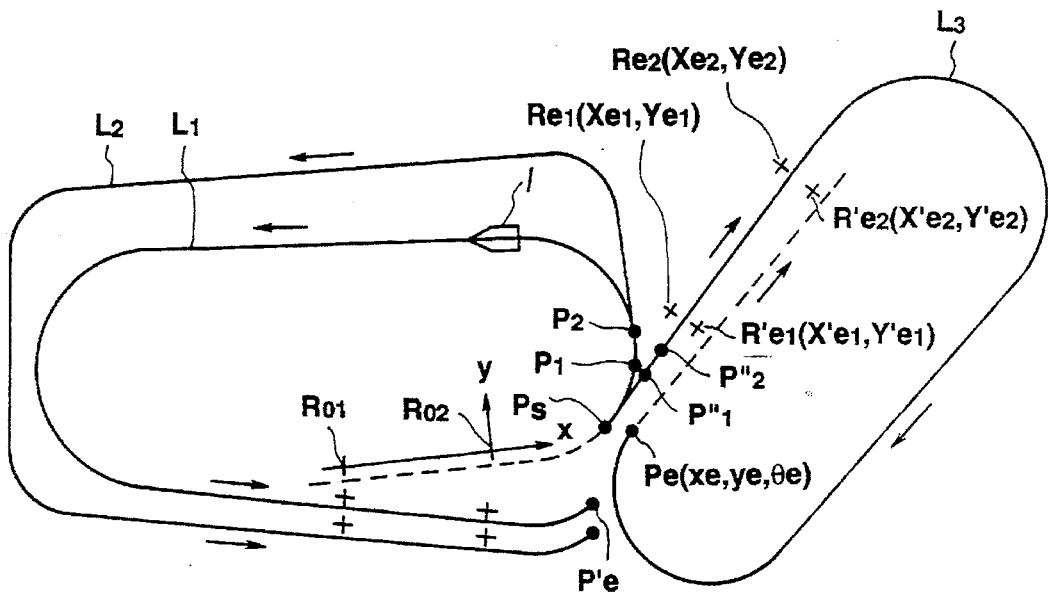
FIG. 1 is a drawing depicting travel of a moving body in the first embodiment of the apparatus for determining the position of a moving body which pertains to the present invention, as viewed from above.

FIG. 1 is a two-dimensional plan view of a moving body 1 moving along a predetermined lane, as viewed from above. The moving body 1 travels selectively over three predetermined lanes, a closed-loop first lane L1, a similar closed-loop second lane L2, and a similar closed-loop third lane L3.

The moving body 1 travels over the lanes L1 through L3 by dead reckoning. During travel, the cumulative errors which accompany dead reckoning are canceled on the basis of relative position with respect to intermittently established reference points (reflecting mirrors) located on the predetermined lanes.

The predetermined lanes L1, L2, and L3 have a common start point Ps. In this course layout, the two adjacent reference points R01 and R02, located forward of the start point Ps for the predetermined lanes L1 and L2, are not included on lane L3.

In order to cause the moving body 1 to travel by a teaching/playback system as described in Japanese Patent Application 3-148911, it is first necessary to establish coordinate axes for defining travel position and traveling direction during original guided travel (playback) and during the teaching travel which precedes playback.

This will be described with reference to the flow chart in FIG. 2.

Measured Travel for Establishing Coordinate System (Step 101)

First, the process for establishing coordinate axes prior to teaching and playback will be described.

Figure 4:
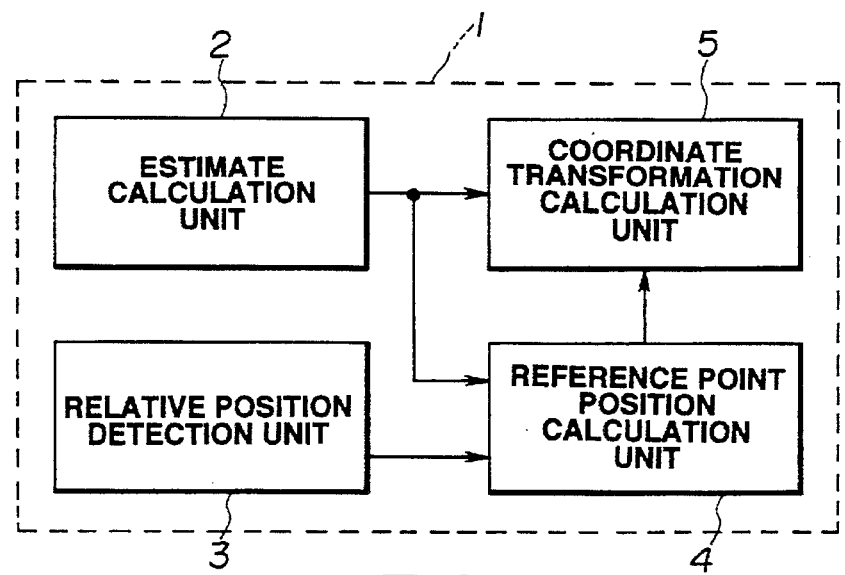
FIG. 4 is a block diagram depicting the design of the apparatus in the embodiments.

FIG. 4 is a block diagram of the design of the apparatus pertaining to the embodiments.

Figure 3:
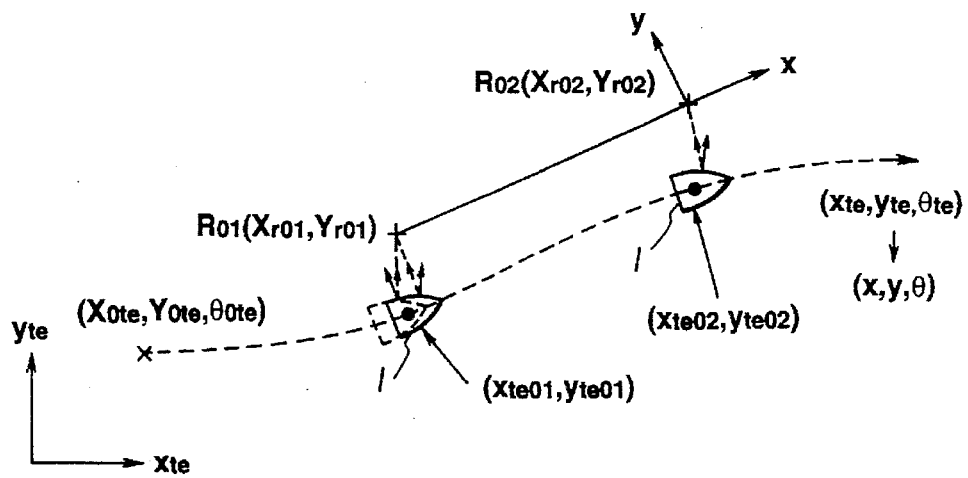
FIG. 3 is a drawing depicting travel of a moving body in the first embodiment and the second embodiment, as viewed from above.

As depicted in FIG. 3, the moving body 1 is first halted at a predetermined position in front of the two adjacent reference points R01 and R02 which are located forward of the start point Ps for the predetermined lanes L1 and L2. This stopping position is temporarily defined as (X0te, Y0te, Θ0te). Expressed differently, this is equivalent to defining temporary coordinate axes xte and yte.

The moving body 1 is then moved from the location (X0te, Y0te, Θ0te). The position and traveling direction of the moving body 1 are then estimated by dead reckoning by an estimate calculation unit 2, using the position (X0te, Y0te, Θ0te) as the initial value in the manner indicated in following equations (1) through (3).

$$xte(t) = \int_{t0}^{t} \cos\theta(t)dl(t) + X0te \tag{1}$$

$$yte(t) = \int_{t0}^{t} \sin\theta(t)dl(t) + Y0te \tag{2}$$

$$\theta te(t) = \int_{t0}^{t} \omega(t)dt + \Theta 0te \tag{3}$$

Assuming that the moving body 1 has now passed the vicinity of the first reference point R01 (the second point before the start point), a relative position detection unit 3 detects and calculates the relative position of the moving body 1 (dX01, dY01) with respect to the first reference point R01, and this information is input to a reference point position calculation unit 4. Possible methods for detecting relative position include a method like that described in Japanese Patent Application 3-148921, wherein calculations are performed on the basis of the distance traveled from the time that light projected from the light projector member of one of two light projector-photoreceptor pairs having differing light projection angles is reflected from a reflecting mirror which serves as a reference point along the predetermined lane and received by the one photoreceptor to the time that light projected from the other light projector is reflected from the same reflecting mirror and received by the other photoreceptor. However, the relative position detection method in the present invention is not restricted to the method disclosed in the aforementioned previous application, and any other method may be employed.

The estimated position at the time that the first reference point R01 is passed (xte01, yte01) is calculated by the estimate calculation unit 2, and the results are input to the reference point position calculation unit 4. When the moving body 1 passes the second reference point R02 shortly thereafter, similar output from the estimate calculation unit 2 and the relative position detection unit 3 is input to the estimate calculation reference point position calculation unit 4.

In the reference point position calculation unit 4, the positions of the first and second reference points R01 (Xr01, Yr01) and R02 (Xr02, Yr02) are calculated according to equation (4), below.

$$Xr0i = x\text{ }te0i - d\text{ }X0i$$
$$Yr0i = y\text{ }te0i - d\text{ }Y0i \quad (i=1,2) \tag{4}$$

The value calculated by the reference point position calculation unit 4 is provided to a coordinate transformation calculation unit 5.

In the coordinate transformation calculation unit 5, coordinate axes x-y are established by the supplied positions of the two reference points R01 and R02. This is due to the fact that once two reference positions are known, direction and position can be determined with certainty, whereby two-dimensional coordinate axes can be determined. For example, with the position of the second reference point R02 (Xr02, Yr02) as the origin, x-y coordinate axes having the line segment which connects the position of the first reference point R01 (Xr01, Yr01) with the position of the second reference point R02 (Xr02, Yr02) as the x axis are established.

Next, the position and traveling direction (Xte, Yte, θte) of the moving body 1 on the temporarily established coordinate axes xte-yte are provided by the estimate calculation unit 2 to the coordinate transformation calculation unit 5, and are subjected to coordinate transformation into a position and traveling direction (x, y, θte) on the newly established coordinate axes x-y, as in equation (5), below.

$$d\,\Theta 0 = \tan^{-1}\{(Yr02-Yr01)/(Xr02-Yr01)\}$$
$$x = (x\,te - X\,r02)\cos(d\,\Theta 0) + (y\,te - Y\,r02)\sin(d\,\Theta 0)$$
$$y = -(x\,te - X\,r02)\sin(d\,\Theta 0) + (y\,te - Y\,r02)\cos(d\,\Theta 0)$$
$$\theta = \theta te - d\,\Theta 0 \quad (5)$$

Teaching/Playback Travel (Step 102)

Once new coordinate axes x-y have been established by the procedure described above, guided travel teaching and playback for the moving body 1 is begun. Specifically, using the position and direction arrived at by transforming position and direction on coordinate axes xte-yte into position and direction on coordinate axes x-y as initial values, an arbitrary position x,y and a traveling direction θ are determined accurately as values on coordinate axes x-y. By this process, the moving body 1 can be guided precisely along the predetermined lane. The initial bearing can be determined precisely if the space between the reference points R01 and R02 is made sufficiently large.

While the position of the second reference point R02 was used as the origin and the line segment which connects the first reference point R01 with the second reference point R02 was used as the x axis here, it is would also be possible to use the first reference point R01 position as the origin and the line segment which connects the first reference point R01 with the second reference point R02 as the y axis.

Figure 2:
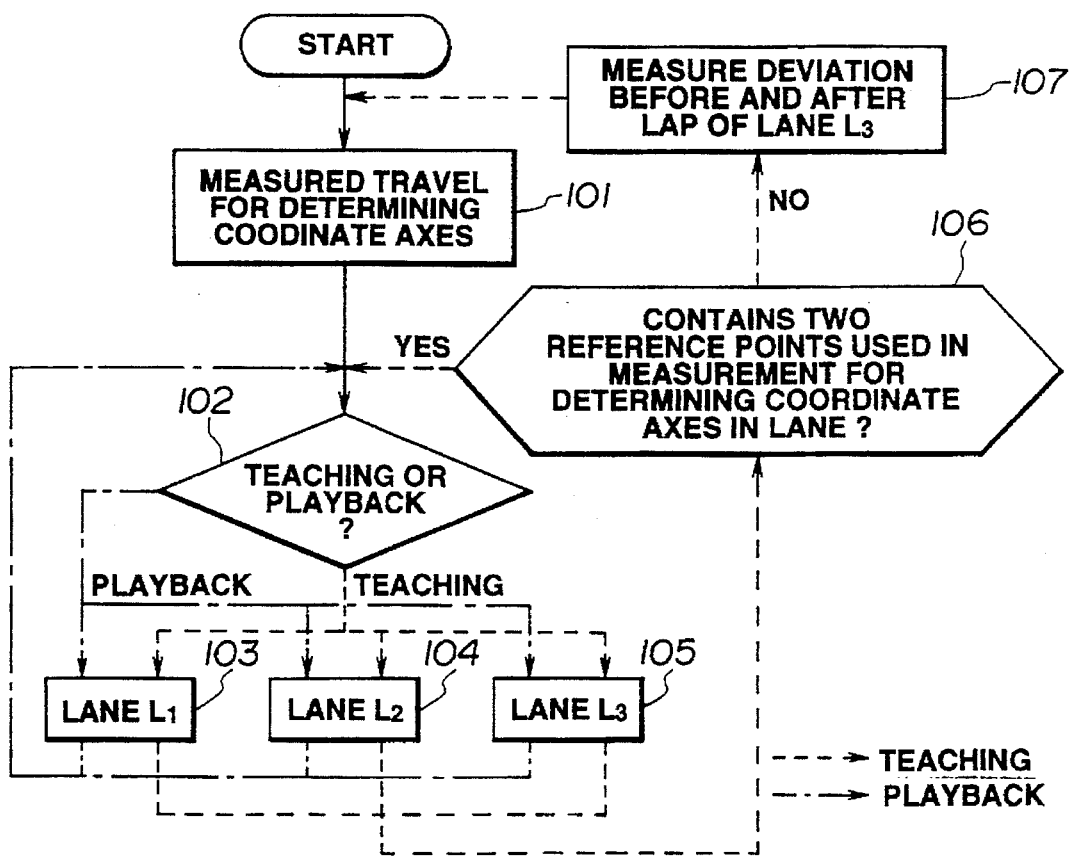
FIG. 2 is a flow chart depicting the process steps in the first embodiment.

The flow indicated by the broken line in FIG. 2 denotes the teaching process and the flow indicated by the dotted/dashed line denotes the playback process.

Teaching Travel on Lanes L1 and L2 (Steps 103 and 104)

Beginning at the point in time at which the moving body 1 reaches the start point Ps, estimated positions on lane L1, P'1, P'2 . . . , are calculated sequentially in the newly obtained coordinate system using a prescribed estimate calculation equation. These are stored in prescribed memory as index passage points for the predetermined lane L1.

When the moving body 1 again reaches the vicinity of the first reference point R01 after completing a lap around lane L1, the position of the first reference point R01 on coordinate axes x-y (X"r01, Y"r01) is recalculated by the method described above. When the moving body 1 again reaches the second reference point R02, the position of the second reference point R02 on coordinate axes x-y (X"r02, Y"r02) is also recalculated.

Meanwhile, as the coordinate axes x-y are determined by the first and second reference points R01 and R02, measurement of the positions of the first and second reference points R01 and R02 on coordinate axes x-y prior to the lap, (X'r01, Y'r01) and (X'r02, Y'r02), has been completed, with assigned values of (X'r01, 0) and (0, 0).

At the point in time at which the moving body 1 has completed the lap and has reached the start point (which serves as the finish point) P'e (xe, ye, θe), the position of the moving body 1 is corrected to the location and direction of Ps on the coordinate axes x-y (xs, ys, θs) using equation (6), below, such that the two successive measurements of the position of R01 are in agreement and the two successive measurements of the direction of R01 and R02 are in agreement.

$$\Delta\theta L1 = \tan^{-1}\{(Y"r02-Y"r01)/(X"r02-X"r01)\}$$
$$xs = (xe-X'r02)\cos\Delta\theta L1 + (ye-Y"r02)\sin\Delta\theta L1$$
$$ys = -(xe-X"r02)\sin\Delta\theta L1 + (ye-Y"r02)\cos\Delta\theta L1$$
$$\theta s = \theta e - \Delta\theta L1 \quad (6)$$

Deviation in the two successive measurements of the position of R01 and in the two successive measurements of the direction of R01 and R02 is stored together with teaching data.

Deviation on lane L2 can be calculated in similar fashion.
Playback Travel on Lanes L1 and L2 (Steps 103 and 104)

The moving body 1 is steered so as to pass predetermined passage points on the basis of teaching data P'1, P'2 . . . for lane L1.

When it is determined that the moving body 1 has reached the finish point, i.e., completed one lap and returned to the original starting point Ps, the position and the direction of the moving body are corrected on the basis of the reference point deviation measured during teaching and equation (6).

Correction of the moving body 1 traveling on lane L2 can be accomplished in similar fashion.
Teaching Travel on Lane L3 (Step 105)

When the moving body is switched to lane L3, beginning at the point in time at which the moving body 1 reaches the start point Ps, estimated positions on lane L3, P"1, P"2, . . . are determined sequentially by an estimate calculation equation, and these are stored in prescribed memory as index passage points for the predetermined lane L3.

When the moving body 1 reaches reference point R11, located immediately after the start point Ps, the position of the reference point R11 on coordinate axes x-y (X11, Y11) is calculated by a method like that described above. When the moving body 1 subsequently reaches reference point R12, the position of the reference point R12 on coordinate axes x-y (X12, Y12) is calculated in similar fashion.

When the moving body 1 has completed a lap around lane L3 and returned to the start point Ps, the position and direction thereof are calculated such that position and direction on the coordinate axes x-y are those at Pe (xe, ye, θe).

The currently traveled lane L3 does not contain the first reference point R01 and the second reference point R02 used for coordinate axes measurement in step 101, so the decision in step 106 in NO, whereupon the process moves to step 107.
Measurement of Deviation Before and After Lap Around Lane L3 (Step 107)

Teaching on lane L3 is thus complete, whereupon the moving body 1 is allowed to continue to travel on lane L3, and the position of the reference point R11 immediately after the start point is recalculated as position R'11 (X'11, Y'11) by the estimated point position calculation means described above. When the moving body 1 has traveled to the next reference point R12, the position of the reference point R12 is recalculated as position R'12 (X'12, Y'12) in similar fashion.

On the basis of the position and traveling direction at the finish point after completing a lap (xe, ye, θe) obtained in this way, the two reference point positions during teaching on lane L3, (X11, Y11) and (X12, Y12), and the two reference point positions after teaching, (X'11, Y'11) and (X'12, Y'12), the estimated position and estimated direction at the finish point Pe (xe, ye, θe) are corrected to the correct position and direction Ps (xs, ys, θs) as indicated by equation (7), below, so that the positions of the reference points R11 and R'11 are in agreement and the direction of R11, R12 and R'11, R'12 are in agreement.

$$\Delta\theta L3 = \tan^{-1}\{(Y'12-Y'11)/(X'12-X'11)\} - \tan^{-1}\{(Y12-Y11)/(X12-X11)\}$$

$$xs = (xe-X'11)\cos(\Delta\theta L3) + (ye-Y'11)\sin(\Delta\theta L3) + X11$$

$$ys = -(xe-X'11)\sin(\Delta\theta L3) + (ye-Y'11)\cos(\Delta\theta L3) + X11$$

$$\theta s = \theta e - \Delta\theta L3 \quad (7)$$

The deviation between the two measurements of position R11 and R'11 and the deviation between the two measurements of the direction of R11, R12 and R'11, R'12 are stored together with teaching data.

Playback Travel on Lane L3 (Step 105)

The moving body 1 is steered so as to pass predetermined passage points on the basis of teaching data P'1, P'2 ... for lane L3.

When it is determined that the moving body 1 has reached the finish point, i.e., completed one lap and returned to the original starting point Ps, correction to the correct position and direction (xs, ys, θs) is made on the basis of the reference point deviation measured during teaching and equation (7).

With the first embodiment described above, even where a body travels over a plurality of different predetermined lanes which do not share any two reference points in common, deviation in its position and traveling location before and after completing a lap around the lane can be measured by a relative position measurement technique so travel of moving body can be guided accurately.

Second Embodiment

A second embodiment of the apparatus for determining the position of moving bodies which pertains to the present invention will be described below.

FIG. 3 and FIG. 4 pertain to the first embodiment as well.

As depicted in FIG. 4, the moving body 1 has an on-board estimate calculation unit 2 for estimating the position (x(t), Y(t)) and traveling direction θ (t) of the moving body on prescribed coordinate axes x-y at time t.

Specifically, where dl(t) is the output of a distance sensor (not shown) on board the moving body 1, ω (t) is the output of an angular velocity sensor, and the initial position and initial direction are (X0, Y0, Θ0), the board estimate calculation unit 2 executes the following estimate calculation, as in equations (8) through (10) described above.

$$x(t) = \int_{t0}^{t} \cos\theta(t)dl(t) + X0 \quad (11)$$

$$y(t) = \int_{t0}^{t} \sin\theta(t)dl(t) + Y0 \quad (12)$$

$$\theta(t) = \int_{t0}^{t} \omega(t)dt + \Theta0 \quad (13)$$

As indicated by equations (11) through (13), above, determination of the position and direction of the moving body 1 through calculation requires the initial values X0, Y0, and Θ0). In order to provide these initial values, it is necessary to establish prescribed coordinate axes, that is coordinate axes x-y, and describe the initial values.

The reference point position calculation unit 4 calculates the positions of the reference points R01 and R02 for establishing the coordinate axes. Here, reference points R01 and R02 are two reference points located immediately forward of the start point on the predetermined lane. The moving body 1 is provided with two on-board light projector-photoreceptor pairs having differing light projection angles; the relative position of the moving body with respect to the reference points is calculated and detected by the relative position detection unit 3 on the basis of the distance traveled from the time that light projected from one light projector member is reflected from a reflecting mirror located at a reference point and received by the one photoreceptor to the time that light projected from the other light projector is reflected from the same reflecting mirror and received by the other photoreceptor. The positions of the reference points are then calculated from this relative position and the current position of the moving body. This calculation technique has been disclosed previously in Japanese Patent Application 3-148921. However, the relative position detection method in the present invention is not restricted to the method disclosed in the aforementioned application, and any other method may be employed.

In the coordinate transformation calculation unit 5, new coordinate axes x-y are established on the basis of the positions of the reference points R01 and R02 calculated by the reference point position calculation unit 4, and position and traveling direction on the temporarily established coordinate axes xte-yte are subjected to coordinate transformation to yield a position and traveling direction on the newly established coordinate axes x-y.

The calculations performed by the reference point position calculation unit 4 and the coordinate transformation calculation unit 5 will be described in sequence below.

Figure 5:
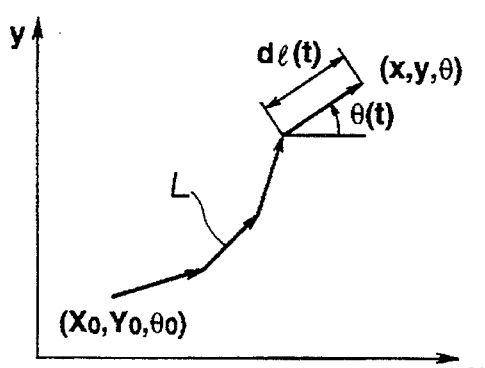
FIG. 5 is a diagram depicting travel of a moving body by dead reckoning in an x-y coordinate system.

The coordinate axes x-y are the coordinate axes which describe the travel position and the traveling direction during original measurement (depicted in FIG. 5), so the following process is conducted prior to this original measurement.

As depicted in FIG. 3, the moving body 1 is first halted, for example, at a predetermined position in front of the two adjacent reference points R01 and R02 which are located forward of the start point on a predetermined lane. This stopping position is temporarily defined as (X0te, Y0te, Θ0te). Expressed differently, this is equivalent to defining temporary coordinate axes xte and yte.

The moving body 1 is then moved from the location (X0te, Y0te, Θ0te). The position and traveling direction of the moving body 1 are then estimated by dead reckoning by the estimate calculation unit 2 using the position (X0te, Y0te, Θ0te) as the initial value in the manner indicated by equations (14) through (16), below.

$$xte(t) = \int_{t0}^{t} \cos\theta(t) dl(t) + X0te \quad (14)$$

$$yte(t) = \int_{t0}^{t} \sin\theta(t) dl(t) + Y0te \quad (15)$$

$$\theta te(t) = \int_{t0}^{t} \omega(t) dt + \Theta 0te \quad (16)$$

Assuming that the moving body 1 has now passed the vicinity of the first reference point R01 (the second point before the start point), the relative position detection unit 3 detects and calculates the relative position of the moving body 1 (dX01, dY01) with respect to the first reference point R01 in the manner described above, and this information is input to the reference point position calculation unit 4. The estimated position at the time that the first reference point R01 is passed (xte01, yte01) is calculated by the estimate calculation unit 2, and the results are input to the reference point position calculation unit 4. When the moving body 1 passes the second reference point R02 shortly thereafter, similar output from the estimate calculation unit 2 and the relative position detection unit 3 is input to the estimate calculation reference point position calculation unit 4.

In the reference point position calculation unit 4, the positions of the first and second reference points R01 (Xr01, Yr01) and R02 (Xr02, Yr02) are calculated with equation (17), below.

$$Xr0i = x\,te0i - d\,X0i$$

$$Yr0i = y\,te0i - d\,Y0i \quad (i=1,2) \quad (17)$$

The value calculated by the reference point position calculation unit 4 is provided to a coordinate transformation calculation unit 5.

In the coordinate transformation calculation unit 5, coordinate axes x-y are established by the supplied positions of the two reference points R01 and R02. This is due to the fact that once two reference positions are known, direction and position can be determined with certainty, whereby two-dimensional coordinate axes can be determined. For example, with the position of the second reference point R02 (Xr02, Yr02) as the origin, x-y coordinate axes having the line segment which connects the position of the first reference point R01 (Xr01, Yr01) with the position of the second reference point R02 (Xr02, Yr02) as the x axis are established.

Next, the position and traveling direction (Xte, Yte, θte) of the moving body 1 on the temporarily established coordinate axes xte-yte are provided by the estimate calculation unit 2 to the coordinate transformation calculation unit 5, and subjected to coordinate transformation into a position and traveling direction (x, y, θte) on the newly established coordinate axes x-y, as in equation (18), below.

$$d\,\Theta 0 = \tan^{-1}\{(Yr02 - Yr01)/(Xr02 - Xr01)\}$$

$$x = (x\,te - Xr02)\cos(d\,\Theta 0) + (y\,te - Yr02)\sin(d\,\Theta 0)$$

$$y = -(x\,te - Xr02)\sin(d\,\Theta 0) + (y\,te - Yr02)\cos(d\,\Theta 0)$$

$$\theta = \theta te - d\,\Theta 0 \quad (18)$$

In this way, once new coordinate axes x-y have been established, the original measurement of the position of the moving body 1 by estimation begins. Specifically, position and direction on the coordinate axes xte-yte (xte, yte, θte) are transformed into position and direction on the coordinate axes x-y (x, y, θ) such that $$X0 = x$$

$$Y0 = y$$

$$\Theta 0 = \theta$$

and used as initial values in the aforementioned equations (11) through (13); arbitrary positions (x, y) and traveling direction θ of the moving body 1 are subsequently calculated correctly as values on the coordinate axes x-y through equations (11) through (13). The initial bearing can be determined precisely if the space between the reference points R01 and R02 is made sufficiently large.

In this second embodiment, the position of the second reference point R02 was used as the origin and the line segment which connects the first reference point R01 with the second reference point R02 was used as the x axis, but it would also be possible to use the first reference point R01 position as the origin and the line segment which connects the first reference point R01 with the second reference point R02 as the y axis.

With the second embodiment described above, coordinate axes for a moving body are established on the basis of the relative position of the moving body with respect to reference points, so coordinate axes can be established easily and inexpensively. Also, since coordinate axes are determined with reference to two reference point locations, it is possible to describe accurately not only initial position but also initial bearing.

INDUSTRIAL APPLICABILITY

With the present invention, even where a body travels over a plurality of different predetermined lanes which do not share any two reference points in common, deviation in its position and traveling location before and after completing a lap around a lane can be measured by a relative position measurement technique so travel of moving body can be guided accurately.

In addition, coordinate axes for the moving body are established on the basis of the relative position of the moving body with respect to reference points, so coordinate axes can be established easily and inexpensively. Also, since coordinate axes are determined with reference to two reference point locations, it is possible to describe accurately not only initial position but also initial bearing.

I claim:

1. An apparatus for determining a position of a moving body, comprising:

estimate calculation means for estimating the position and traveling direction of the moving body on predetermined coordinate axes, and;

relative position detection means for detecting a relative position of the moving body with respect to reference points established intermittently along a predetermined lane for the moving body;

the position and traveling direction of the moving body estimated by the estimate calculation means being corrected intermittently on the basis of an output of the relative position detection means and positions of the reference points so that the moving body travels along the predetermined lane on the basis of the corrected position and traveling direction;

wherein the predetermined lane comprises:

a closed-loop first lane which has first and second reference points immediately forward of a start point; and a closed-loop second lane which has no first or second reference point, the apparatus comprises:

reference point position calculation means for calculating the position of the first reference point on the basis of the estimated position output by the estimate calculation means when the moving body passes the first reference point on the first lane and of the relative position of the moving body with respect to the first reference point output by the relative position detection means, and for calculating the position of the second reference point on the basis of the estimated position output by the estimate calculation means when the moving body passes the second reference point on the predetermined lane and of the relative position of the moving body with respect to the second reference point output by the relative position detection means;

coordinate transformation calculation means for establishing new coordinate axes, which differ from the predetermined coordinate axes, on the basis of the positions of the first and second reference points on the predetermined coordinate axes calculated by the reference point position calculation means, performing calculations to transform the position and traveling direction on the predetermined coordinate axes output by the estimate calculation means into a position and traveling direction on the newly established coordinate axes, and using the transformed position and traveling direction as initial value settings for estimate calculation by the estimate calculation means;

first deviation calculation means for storing the positions of the first and second reference points as positions on the newly established coordinate axes in the coordinate transformation calculation means, calculating the positions of the first and second reference points with the reference point position calculation means just before the moving body returns to the start point after completing a lap of the first lane, and calculating a reference point deviation produced when the moving body has completed a lap of the first lane on the basis of the positions of the first and second reference points stored in the coordinate transformation calculation means and the positions of the first and second reference points which have been recalculated just before the moving body returns to the start point after completing a lap of the first lane;

first correction means for correcting the position and traveling direction of the moving body each time that the moving body completes a lap of the first lane and returns to the start point, on the basis of the deviation calculated by the first deviation calculation means;

second deviation calculation means for calculating with the reference point position calculation means the positions of two reference points immediately after the start point on a second lane as positions on the coordinate axes that have been established in the coordinate transformation calculation means for the first lane as the moving body travels on the second lane, recalculating the positions of the two reference points with the reference point position calculation means when the moving body has completed a lap of the second lane, returned to the start point, and subsequently continued to travel, and calculating a reference point deviation produced when the moving body has completed a lap of the second lane on the basis of the positions of the two reference points calculated just after starting a lap of the second lane and the positions of the two reference points recalculated after the moving body has returned to the start point after completing a lap of the second lane; and second correction means for correcting the position and traveling direction of the moving body each time that the moving body completes a lap of the second lane and returns to the start point on the basis of the deviation calculated by the second deviation calculation means.

2. An apparatus for determining a position of a moving body as defined in claim 1, wherein the new coordinate axes are established such that the first reference point or the second reference point is an origin and a line segment which connects the first reference point and the second reference point is an x axis or a y axis.

3. An apparatus for determining a position of a moving body, comprising:

estimate calculation means for estimating the position and traveling direction of a moving body on predetermined coordinate axes, and;

relative position detection means for detecting a relative position of the moving body with respect to reference points established intermittently on a predetermined lane for the moving body;

wherein the apparatus comprises:

reference point position calculation means for calculating a position of a first reference point on the basis of the estimated position output by the estimate calculation means when the moving body passes the first reference point on a predetermined lane and the relative position of the moving body with respect to the first reference point output by the relative position detection means, and for calculating the position of the second reference point on the basis of the estimated position output by the estimate calculation means when the moving body passes the second reference point on the predetermined lane and the relative position of the moving body with respect to the second reference point output by the relative position detection means; and coordinate transformation calculation means for establishing new coordinate axes, which differ from the predetermined coordinate axes, on the basis of the positions of the first and second reference points on the predetermined coordinate axes calculated by the reference point position calculation means, and performing calculations to transform the position and traveling direction on the predetermined coordinate axes output by the estimate calculation means into a position and traveling direction on the newly established coordinate axes, the position and traveling direction transformed by the coordinate transformation calculation means being used as initial values for estimate calculation by the estimate calculation means.

4. An apparatus for determining a position of a moving body as defined in claim 3, wherein the newly established coordinate axes are coordinate axes having a line segment which connects the first reference point and the second reference point as an x axis or a y axis, and the first reference point or the second reference point as an origin.

* * * * *